May 13, 1941.  A. E. BOLLINGER  2,241,391
COATED PULLEY
Filed Nov. 25, 1938
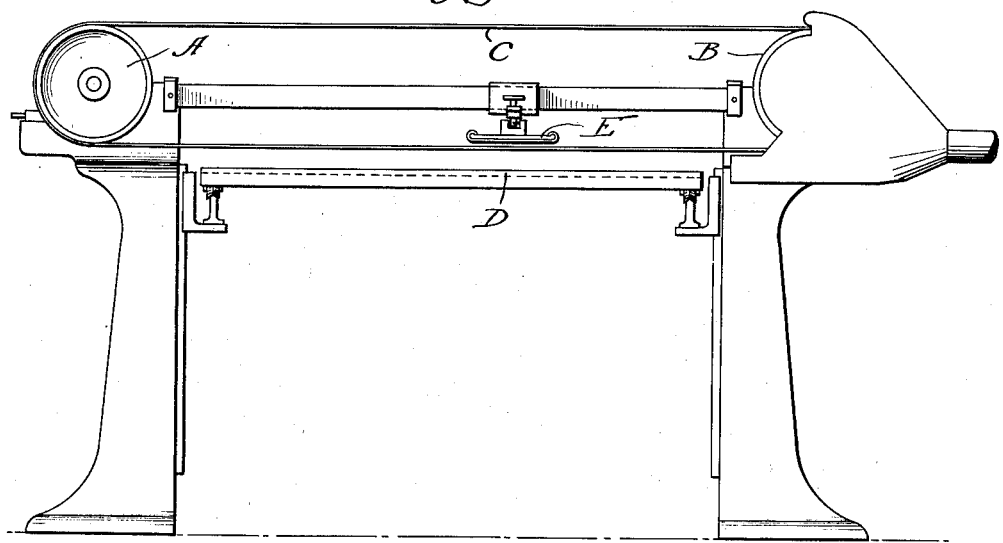
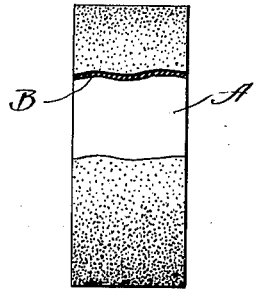
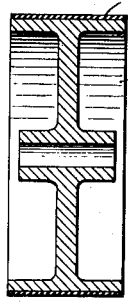
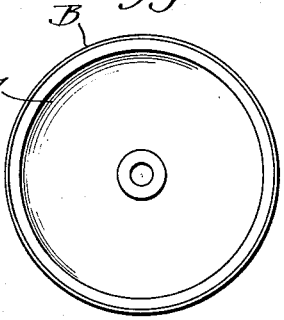
INVENTOR
Allan E. Bollinger
BY Paul Carpenter
ATTORNEY Patented May 13, 1941

2,241,391

UNITED STATES PATENT OFFICE 2,241,391

COATED PULLEY

Allan E. Bollinger, York, Pa., assignor to Minnesota Mining & Manufacturing Company, St. Paul, Minn., a corporation of Delaware Application November 25, 1938, Serial No. 242,358

9 Claims. (Cl. 74—230.7)

The present invention relates to improvements in pulleys or the like and especially in the surfaces thereof which come into contact with and/or drive belting, friction members or the like.

Heretofore suggestions have been made to cover the surface or face of a pulley with a tire or casing of varying compositions, for example, canvas impregnated with glue and/or gelatine. Others have suggested applying such sticky materials directly to the driving faces of pulleys and have indicated ways by which to minimize the tendency of glue to become hard and glassy. All such methods and suggestions have various disadvantages, as will become apparent.

Where impregnated woven fabrics are joined to the pulley surfaces, it is not unusual for the same to lose its bond to the pulley surface and thus make repair immediately necessary. Another disadvantage is the tendency of such materials to fly completely off of the pulley, especially when the latter is rotating at high speeds, due to their inability to resist the high centrifugal force, thereby usually leaving the pulley surface in worse condition than though no covering had been applied thereto. Disadvantages of using glues and the like on pulley surfaces, without any woven fabric, will be obvious.

It is an object of this invention to provide an improved pulley structure and a convenient method by which the life and/or value of a pulley may be greatly enhanced. A further object is to provide a surfacing for pulleys which will increase their tractive power and yet will be hard and heat resistant. A further object is to provide a material or cement of preferred composition and one which is advantageous in coating the driving faces of pulleys. These and other objects and advantages will appear from the specification taken as a whole.

The appended drawing illustrates pulleys having a coating composition as herein described, and an exemplary use thereof.

Fig. 1 is an elevational view of a pulley with a portion of the surface thereof broken away;

Fig. 2 is a sectional view of Fig. 1;

Fig. 3 is a side view of Fig. 1; and

Fig. 4 illustrates a sanding machine equipped with a pulley of the type illustrated in any of Figs. 1, 2 or 3.

As is illustrated in the drawing, pulley A (which may be made of steel, iron, aluminum bearing metal or other alloy, or even wood) is provided with a hard, heat-resistant cement coating B, the latter being advantageously a rubber cement.

As shown in Fig. 4, pulley A having surface coating B drives belt C. In this illustration, belt C is an abrasive belt which may for example consist of a woven or fibrous backing to which abrasive grit is bonded by any suitable resinous or bonding material. Articles to be polished or abraded may be placed on table D and pushed against belt C, undue deflection of belt C being prevented by member E.

The following formulae illustrate compositions which may advantageously be employed in coating the surfaces of metal or like pulleys, such as illustrated in the drawing.

Example 1

| | |
|---|---|
| Red inner-tube reclaimed rubber__pounds__ | 700 |
| Wood rosin_____do____ | 465 |
| Limed wood rosin_____do____ | 640 |
| Sodium hydroxide solution_____do____ | 10 |
| Petroleum solvent_____gallons__ | 345 |

The limed wood rosin mentioned in the above table was a fused calcium rosinate (7% lime and 93% rosin). The particular sodium hydroxide solution employed in the above formula consisted of 50% water and 50% NaOH. The illustrative petroleum solvent employed had a specific gravity of 0.70, an initial boiling point of 140° F. and an end boiling point of 210° F.

The following will illustrate a suitable and advantageous method which has been employed in compounding the above ingredients. The reclaimed rubber is first softened and warmed, for example, on a two-roll rubber mill. The softened reclaim may then be transferred to an internal mixer, such as a mixer of the Werner-Pfleiderer type. Then the rosin and the limed rosin may be added while continuously mixing the ingredients until a smooth uniform mass is obtained. About one-half of the petroleum solvent may then be added slowly while continuing the mixing until the solvent is thoroughly mixed throughout the mass. The sodium hydroxide solution may next be added and also the balance of the petroleum solvent may be added and the mixing continued until the solvent is uniformly dispersed throughout the mass.

The resulting smooth cement, when applied to the surface of a pulley, e. g. metal pulleys used in driving belts, will set to form a hard and heat-resistant layer or coating which adheres tenaciously to the surface of the pulley and will not tear loose or fly off even under the great centrifugal force encountered at high speeds.

For example, in the use of sanding machines, peripheral speeds of the order of 6000 feet per minute are common and, in the case of pulleys having a diameter of the order of 20 inches, more or less, high centrifugal forces are set up. Cements of the type above illustrated will readily withstand these and higher speeds without losing their bond to the pulley surfaces.

Another cement which may be employed for the purposes of this invention is the following.

*Example 2*

| | | |
|---|---|---|
| Reclaimed rubber | pounds | 100 |
| Wood rosin | do | 10 |
| Limed rosin | do | 138 |
| Ethyl alcohol | do | 5 |
| Petroleum solvent | gallons | 50 |

The rubber may, for example, be of the same type as that illustrated in Example 1 or it may be from a different source, as desired. The limed rosin and petroluem solvent may likewise, by way of illustration, be generally of the nature illustrated in Example 1. It will be seen that the cement of Example 2 contains some alcohol as distinguished from Example 1. Among other thing, this has the advantageous effect of increasing the fluidity of the cement for a given percentage of solvent content.

The ingredients of Example 2 may be advantageously compounded in generally the manner described in Example 1.

Cements of the general type hereinabove illustrated, upon application to a desired surface such as a pulley surface, set to form a hard layer or surface coating which is heat-resistant and is ideally adapted as a supporting or tractive surface to come into contact with fibrous or leather belts or the like.

It will be understood that the above examples are included by way of illustration only, and not by way of limitation. Other cements which will provide an adherent coating which is hard and heat-resistant and has suitable tractive characteristics may be used. It will be evident that the particular rubber illustrated may be replaced by other rubber or rubber derived from other sources. Also, while wood rosin is mentioned by way of illustration it will be recognized that other forms of abietic acid and/or derivatives thereof, or other suitable resins, may be employed, though rosin and rosin derivatives are advantageous materials. Likewise, the specific alkali named may be replaced by sodium hydroxide and/or certain other alkaline materials and the specific solvent named may, if desired, be replaced by other suitable solvent or other hydrocarbons whether of a like or different boiling range, although the specific boiling range mentioned by way of illustration is advantageous in that the solvent will readily evaporate.

In arriving at a preferred cement for purposes of this invention, a high resin content is desired. Where rosin and/or rosinate make up the resin employed, it is desired that the same be present to a greater extent by weight than the reclaimed rubber or the like. For example, the rosin and/or rosinate may be present in a proportion of the order of one and one-half times to twice that of the reclaim, by weight. Where desired, the proportion of rosin to reclaim may be somewhat above this range.

It is desirable for a substantial portion of the rosin to be in the form of a soap, for example in the form of a soap of one of the heavy metals such as calcium. The ratio of rosin to reclaim and the presence of a substantial proportion of rosin soap, as described and illustrated hereinabove, are important factors in the production of a cement which will set to form a coating which is hard and heat-resistant. That is, it is desirable for the resin or rosinous material to have a relatively low acid number, e. g. 30 or less.

The cements may be applied to the desired surfaces by spraying or brushing the same on, or otherwise. Only a very thin layer or coating is necessary to secure advantages described herein, although a thicker coating may be applied where desired. Of cements as herein illustrated 20 to 60 grains of cement, more or less, per 100 square inches of pulley surface may be used. However it will be understood that coating having an order of thickness much greater than this, or less than this, are also contemplated.

While I have herein illustrated compositions which can be used with special advantage in the coating of pulleys, friction wheels, and the like, it will be understood that other equivalent or substitute compositions or rubber cement are comprehended. Also, though this invention has been illustrated to a large degree in connection with pulleys for driving belts, it will be understood that it has other uses and applications where tractive or protective coatings are desired. All variations and embodiments comprehended within the scope of the appended claims, as well as those herein described and illustrated, are contemplated.

What I claim is:

1. A tractive member whose driving surface is coated with a thin, coherent and adherent coating of the dried residue of a rubber cement, said coating having a substantially non-tacky exposed surface and maintaining its adhesion to the underlying surface of said tractive member and resisting tendency to tear loose therefrom under high centrifugal force.

2. A rotary traction member whose tractive surfaces comprise a layer of a cement composition comprising rubber and a resin, the resin being present in excess of the rubber.

3. A pulley having an inner portion of metal and a driving face comprised of a solidified solvent type cement comprising reclaimed rubber and a rosinous material, the latter being present to an extent by weight at least approximately as great as that of said rubber.

4. A traction member having an inner portion of metal and a tractive surface coated with a thin solidified coherent and adherent coating of a composition comprising a rosinous material and reclaimed rubber, said rosinous material comprising rosin having a substantial proportion of the abietic acid thereof converted into a metal abietate, said coating maintaining its adhesion to the underlying metal surface of said tractive member and resisting tendency to tear loose therefrom under high centrifugal force.

5. A pulley having the face thereof formed of a hard, heat-resistant adherent and coherent rubbery material, said rubbery material comprising the dried film or layer of a cement comprising rubber, wood rosin, limed wood rosin, sodium hydroxide and petroleum solvent.

6. A pulley having an inner portion of metal and having the face thereof formed of a hard, heat-resistant rubbery material, said rubbery material adhering to said metal and comprising the dried film or thin layer of a cement comprising rubber, wood rosin, limed rosin, ethyl alcohol and petroleum solvent.

7. A solvent type cement for use in surfacing pulleys having an interior portion of iron, steel or other metal, said cement comprising reclaimed rubber, limed rosin and rosin treated with an alkali metal hydroxide, all dispersed in a hydrocarbon solvent.

8. A sanding machine comprising a pulley adapted to drive a fibrous abrasive belt, said pulley having its working face formed of the dried film of a cement comprising reclaimed rubber and a rosinous material, said rosinous material being present to the extent by weight of 1.5 to 2 times that of said rubber.

9. A composition to be applied for coating the surface of belt pulleys and the like comprising rubber and a resin in a volatile solvent, said resin being present to an extent by weight at least approximately as great as that of said rubber, whereby increased traction between the said pulley and belt or other engaging member is obtained.

ALLAN E. BOLLINGER.